(12) United States Patent
Alkabie et al.

(10) Patent No.: US 7,624,576 B2
(45) Date of Patent: Dec. 1, 2009

(54) LOW SMOKE AND EMISSIONS FUEL NOZZLE

(75) Inventors: Hisham Alkabie, Oakville (CA); Klan McCaldon, Orangeville (CA); Victor Gandza, Bolton (CA); John Hu, Markham (CA)

(73) Assignee: Pratt & Whitney Canada Corporation, Longueuil, Québec (CA)

( * ) Notice: Subject to any disclaimer, the term of this patent is extended or adjusted under 35 U.S.C. 154(b) by 607 days.

(21) Appl. No.: 11/182,750

(22) Filed: Jul. 18, 2005

(65) Prior Publication Data

US 2007/0012042 A1    Jan. 18, 2007

(51) Int. Cl.
*F02C 1/00* (2006.01)
*F02G 3/00* (2006.01)

(52) U.S. Cl. .................... 60/740; 60/748; 239/399

(58) Field of Classification Search ............ 60/740, 60/742, 748; 239/399, 403, 533.2
See application file for complete search history.

(56) References Cited

U.S. PATENT DOCUMENTS

| | | | | |
|---|---|---|---|---|
| 1,500,012 A * | 7/1924 | Staples | ............ | 239/402 |
| 2,308,439 A * | 1/1943 | Carroll | ............ | 239/406 |
| 2,698,050 A | 12/1954 | Bloomer et al. | | |
| 3,893,296 A | 7/1975 | Fredriksen | | |
| 3,952,503 A | 4/1976 | Fox et al. | | |
| 4,078,377 A | 3/1978 | Owens et al. | | |
| 4,150,539 A | 4/1979 | Rubins et al. | | |
| 4,258,544 A * | 3/1981 | Gebhart et al. | ............ | 60/800 |
| 4,350,009 A | 9/1982 | Holzapfel | | |
| 5,239,831 A | 8/1993 | Kuroda et al. | | |
| 5,319,923 A | 6/1994 | Leonard et al. | | |
| 5,357,743 A | 10/1994 | Zarzalis et al. | | |
| 5,598,696 A * | 2/1997 | Stotts | ............ | 60/779 |
| 5,613,363 A * | 3/1997 | Joshi et al. | ............ | 60/737 |
| 5,680,766 A * | 10/1997 | Joshi et al. | ............ | 60/746 |
| 6,073,436 A * | 6/2000 | Bell et al. | ............ | 60/39.094 |
| 6,141,968 A * | 11/2000 | Gates et al. | ............ | 60/740 |
| 6,418,726 B1 * | 7/2002 | Foust et al. | ............ | 60/776 |
| 6,460,340 B1 * | 10/2002 | Chauvette et al. | ............ | 60/740 |
| 6,651,439 B2 | 11/2003 | Al-Roub et al. | | |
| 6,755,024 B1 * | 6/2004 | Mao et al. | ............ | 60/776 |
| 6,761,035 B1 * | 7/2004 | Mueller | ............ | 60/800 |
| 6,817,183 B2 * | 11/2004 | Modi et al. | ............ | 60/748 |
| 7,415,828 B2 * | 8/2008 | Brown | ............ | 60/798 |
| 2003/0221429 A1 * | 12/2003 | Laing et al. | ............ | 60/740 |
| 2004/0250547 A1 * | 12/2004 | Mancini et al. | ............ | 60/740 |
| 2005/0028526 A1 * | 2/2005 | Von Der Bank | ............ | 60/748 |
| 2005/0039456 A1 * | 2/2005 | Hayashi | ............ | 60/737 |
| 2006/0059915 A1 * | 3/2006 | Furletov et al. | ............ | 60/740 |
| 2006/0248898 A1 * | 11/2006 | Buelow et al. | ............ | 60/776 |
| 2007/0028624 A1 * | 2/2007 | Hsieh et al. | ............ | 60/776 |
| 2007/0163263 A1 * | 7/2007 | Thomson | ............ | 60/773 |
| 2007/0289306 A1 * | 12/2007 | Suria et al. | ............ | 60/748 |

\* cited by examiner

*Primary Examiner*—William H Rodriguez
(74) *Attorney, Agent, or Firm*—Ogilvy Renault

(57) ABSTRACT

A fuel nozzle having a fuel conveying member surrounded by a sheath. An air passage is defined between the fuel conveying member and the sheath for directing air to an air swirler provided at one end of the fuel conveying member. At one flow director is provided in the air passage for promoting air and fuel uniformity and distribution at a spray tip of the fuel nozzle.

13 Claims, 3 Drawing Sheets

LOW SMOKE AND EMISSIONS FUEL NOZZLE

TECHNICAL FIELD

The invention relates generally to a fuel nozzle for gas turbine engines and, more particularly, to a fuel nozzle promoting air and fuel uniformity and distribution.

BACKGROUND OF THE ART

It is desirable for a fuel nozzle to demonstrate uniformity in the air and fuel droplets distribution. The uniformity of air is essential to assist in fuel atomization and help promote fuel spray uniformity. A lower size droplet distribution promotes better mixing and heat release per nozzle thereby resulting in a lower smoke number and low emissions.

Accordingly, there is a need to provide a fuel nozzle that provides uniformity of air and fuel to impose better mixing and promote low emissions.

SUMMARY OF THE INVENTION

It is therefore an object of this invention to provide a fuel nozzle proving uniformity of air and fuel to impose better mixing and promote low emissions.

In one aspect, the present invention provides a gas turbine engine fuel nozzle comprising: a fuel conveying member defining at least one fuel passage, a spray tip connected in fluid flow communication with said at least one fuel passage, the spray tip having an air swirler, a sheath provided about the fuel conveying member, an air passage defined between the fuel conveying member and the sheath, the air passage leading to air openings defined through the air swirler, an air inlet defined in the sheath for connecting the air passage in fluid flow communication with a source of air, and at least one flow director provided in the air passage between the sheath and the fuel conveying member.

In another aspect, the present invention provides a fuel nozzle comprising a stem having at least one fuel passage extending therethrough, a spray tip connected in fluid flow communication with the stem, the spray tip having an air swirler, a tubular sheath having a sidewall surrounding the stem defining an air passage therebetween, the air passage being connected in fluid flow communication with said spray tip, the sidewall of the tubular sheath defining an aperture in fluid flow communication with the air passage, and at least one wing-like projection extending from said stem into said air passage for directing air entering the air passage from the aperture to the air swirler of the spray tip.

In still another aspect, the present invention provides a method of promoting fuel spray uniformity at a spray tip of a gas turbine engine fuel nozzle: comprising the steps of: a) capturing the dynamic head imposed by a flow of incoming air, and b) directing the air into an air swirler of the spray-tip for atomizing the fuel flowing through said spray tip.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
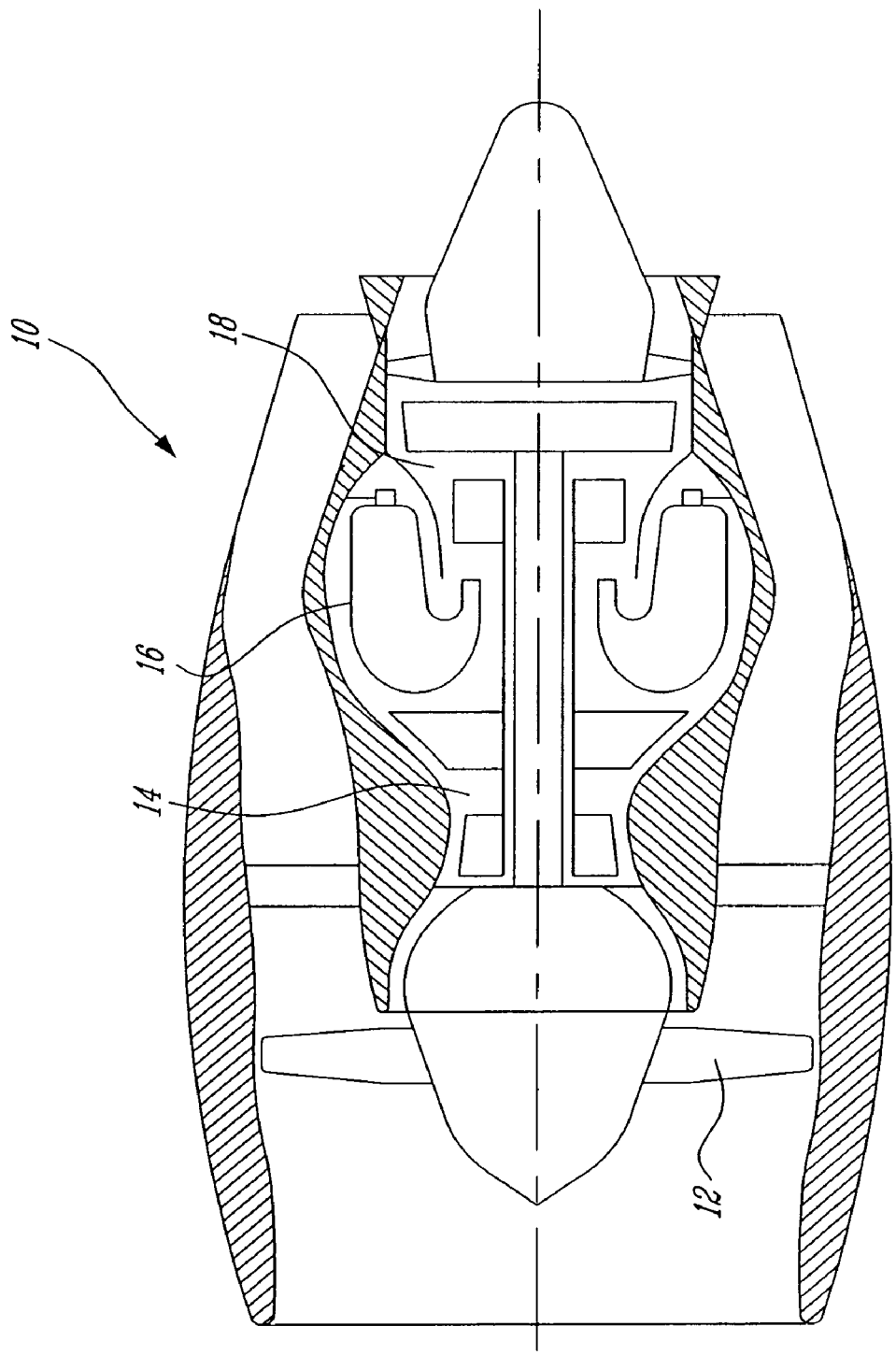
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The resulting high temperature combustion gases are used to turn the turbine section 18 and produce thrust when passed through a nozzle.

Figure 2:
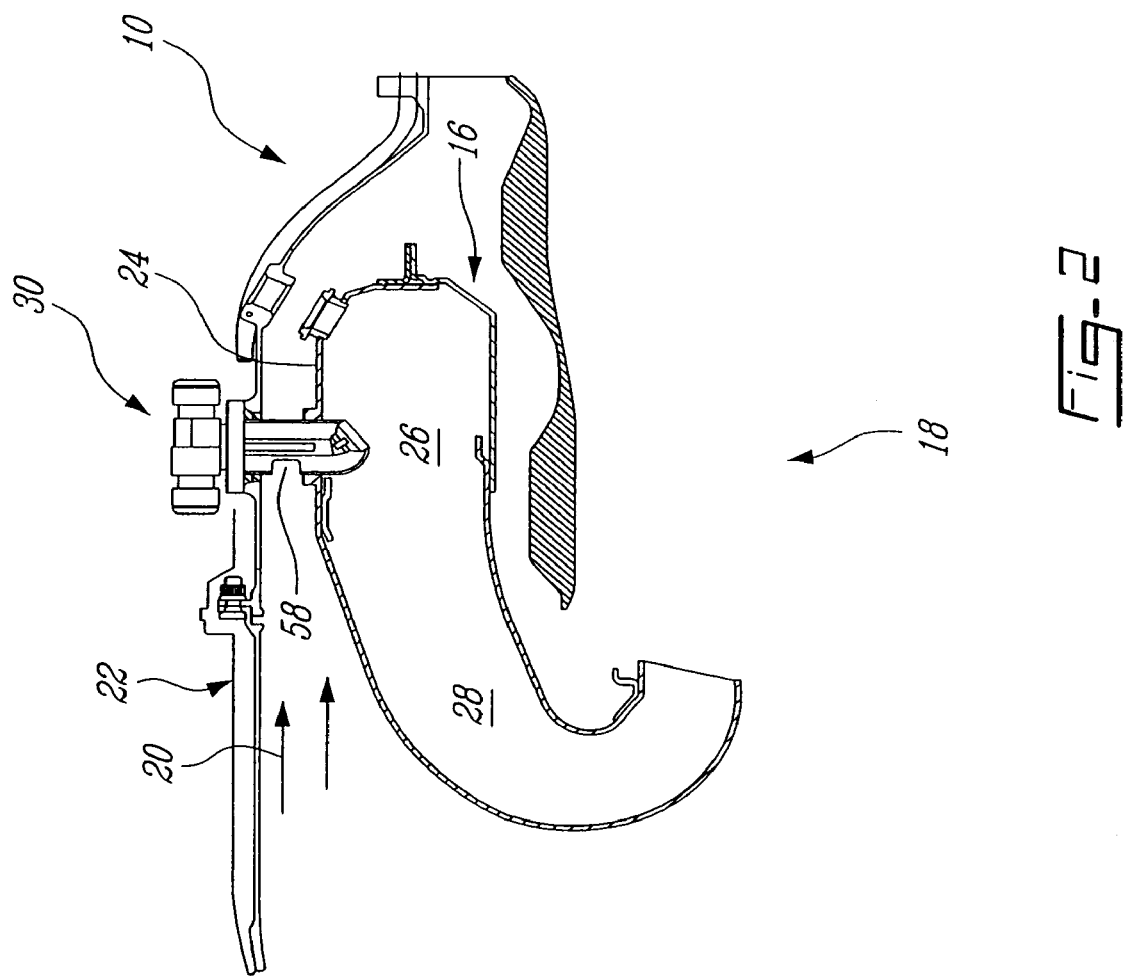
FIG. 2 is an axial cross-sectional view of a combustor of the gas turbine engine showing a fuel nozzle.

Reference is now made to FIG. 2 of the drawings which illustrates one exemplary embodiment of the combustor 16. The combustor 16 shown is a reverse flow combustor 16, however it should be understood that other types of combustor, such as an axial flow combustor, may have also been exemplified. The combustor 16 is fixedly mounted by suitable means in an air flow path, designated generally by arrows 20, and receiving air from the compressor 14 or any other source of air. More particularly, the combustor 16 is mounted within the engine casing 22 which defines an annular or cylindrical flow path. The combustor 16 comprises an annular or cylindrical housing 24 which defines a primary combustion zone 26 and a dilution zone 28. Mounted to the engine casing walls 22 and to the combustor housing 24 is a plurality of fuel nozzles 30, one of which is shown in FIG. 2. The fuel nozzle 30 extends through the engine casing 22 and the combustor housing 24 such that it is in fluid flow communication with the primary combustion zone 26.

Figure 3:
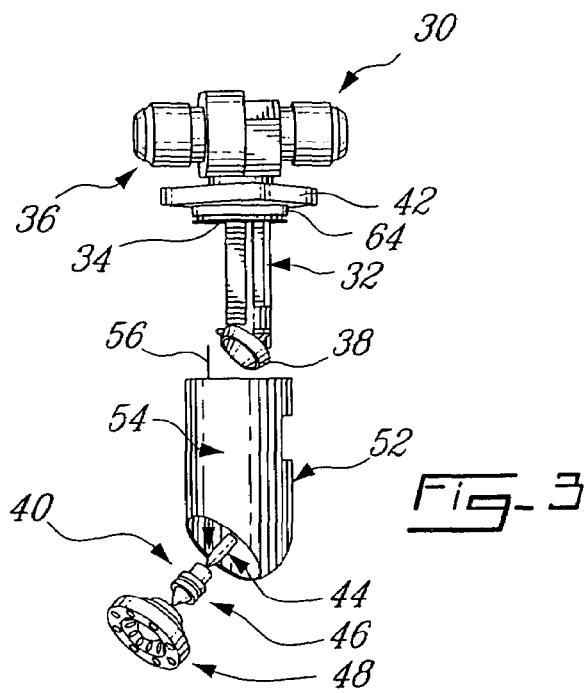
FIG. 3 is an exploded view of the fuel nozzle, showing a stem with directing members and a tubular sheath in accordance with an embodiment of the present invention.
Figure 4:
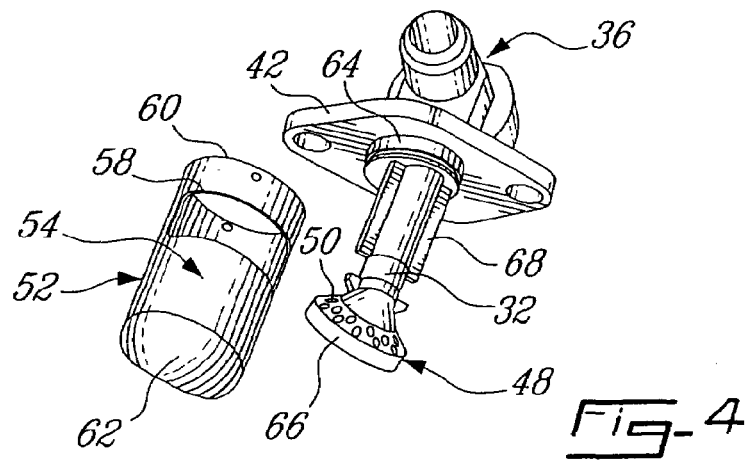
FIG. 4 is a perspective view of the fuel nozzle of FIG. 3, showing the tubular sheath detached from the stem.
Figure 5:
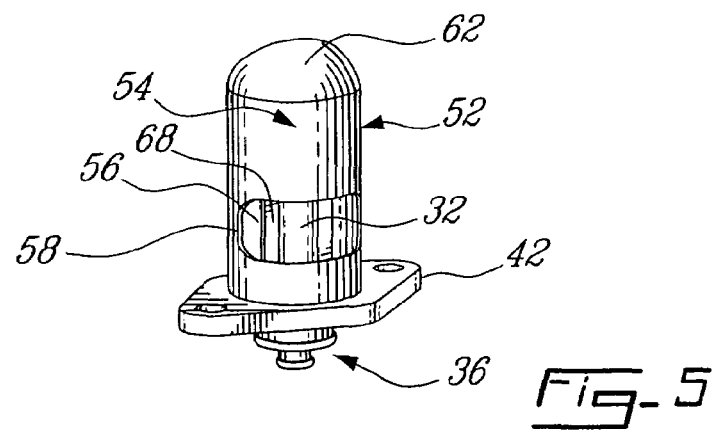
FIG. 5 is a perspective view of a part of the fuel nozzle of FIG. 3, showing the tubular sheath surrounding the stem.

The fuel nozzle 30 exemplified in FIGS. 3 to 5 comprises a fluid conveying member which might, for instance, include a stem 32. The stem 32 is adapted to be coupled at the inlet end 34 thereof to a fuel manifold adapter 36 and at the outlet end 38 thereof to a spray tip assembly 40. Accordingly, the spray tip assembly 40 is coupled through the stem 32 to the fuel manifold adapter 36 which is connected to a fuel injector (not shown). The configuration of the stem 32 allows for the source of fuel supplied by the fuel injector to be directed from the inlet end 34 to the outlet end 38. The fuel is then atomized by the spray tip assembly 40 for ignition in the primary combustion zone 26, as is well known in the art.

More particularly, the stem 32 may include primary and secondary fuel conduit flow passages (not shown) directing a primary and a secondary fuel flow from the inlet end 34 to the outlet end 38. A portion of the inlet end 34 of the stem 32 is adapted to be inserted into a receiving opening (not shown) defined in the bottom portion of the fuel manifold adapter 36. The fuel manifold adapter 36 is provided with primary and secondary fuel outlets (not shown) configured for connection with the primary and secondary conduit inlets (not shown) of the stem 32 thereby defining a flow relationship. The stem 32 may be secured to the fuel manifold adapter 36 by way of welding, brazing or the like.

As seen in FIGS. 2 to 5, the fuel manifold adapter 36 is provided with a flange 42 for mounting the fuel nozzle 30 to the engine casing 22 of the gas turbine engine 10.

Now referring concurrently to FIGS. 3 and 4, the spray tip assembly 40 may include a primary swirler 44, a secondary swirler 46 and an air swirler 48, for imparting a swirling motion to the air and fuel passing therethrough as will be further described lateron. The swirling action of the air and fuel enhances mixing thereof. Specifically, the primary swirler 44 is connected to the primary fuel conduit outlet (not shown) for receiving the primary fuel flow. Similarly, the secondary air swirler 46 is connected to the secondary fuel conduit outlet for receiving the secondary fuel flow.

The air swirler 48 of the spray tip assembly 40 is provided with a plurality of circumferentially spaced air passages 50 that are adapted to convey a swirling air flow for blending with the primary and secondary fuel sprays emanating from the primary and secondary spray orifices (not shown) of the spray tip assembly 40. Preferably, the spray tip assembly 40 is brazed into the receiving opening defined at the outlet end 38 of the stem 32. Also, the primary, secondary and air swirlers 44, 46 and 48 respectively are preferably inter-brazed so as to form an integral spray tip assembly 40.

The fuel nozzle 30 also comprises a tubular sheath 52 having a sidewall 54 that surrounds the stem 32 defining an annular flow passage 56 therebetween. A single air inlet or aperture 58 is defined in the sidewall 54 of the sheath 52 at a first open end portion 60 thereof. As shown in FIG. 2, the aperture 58 is disposed in the air flow path 20 in facing relationship with the incoming discharged compressor air. The aperture 58 connects the air flow passage 56 in fluid flow communication with the air flow path 20. The aperture 58 has an elongated shape and extends about haft of the circumference of the sheath 52, as best illustrated in FIG. 4. The first end portion 60 of the sheath 52 is adapted for attachment to the flange 42 of the fuel manifold adapter 36. The sheath 52 has a second end portion 62 adapted for attachment to the spray tip assembly 40 such that the flow passage 56 leads to the air passages 50 defined in the air swirler 48. A slanted opening 61 is defined in the second end 62 of the sheath 52 to receive the air swirler 48, as best shown in FIGS. 2 and 3.

More specifically, the first end portion 60 is preferably sealingly coupled, for example by a weld or a braze, to a surface 64 projecting from the flange 42 adjacent the inlet end 34 of the stem 32. The second open end portion 62 is sealingly coupled to the air swirler 48 of spray tip assembly 40 in a similar fashion such that the flow passage 56 is in fluid flow communication with the air passages 50 of the air swirler 48.

The sheath 52 is preferably cylindrical in shape. The surface 64 extending from the flange 42 is also circular to mate with the first end portion 60 and the air swirler 48 of the spray tip assembly 40 has a generally circular periphery 66 to mate with the outline of the opening 61 provided at the second end portion 60 of the tubular sheath 52. It should be understood however that various alternatives are also contemplated.

Furthermore, the fuel nozzle 30 comprises at least one flow directing member 68 preferably disposed on the stem 32 and extending in the flow passage 56 for directing a fluid flow passing therethrough. In accordance with the preferred embodiment illustrated, in FIGS. 3 to 5, a pair of directing members 68 extends outwardly from opposite sides of the stem 32. The directing members 68 extend axially from the inlet end 34 to approximately ¾ of the stem 32 length (FIG. 4). Moreover, the pair of directing members 68 is preferably wing shaped. Those wing shaped projections are positioned in facing relationship with the inlet aperture 58 (see FIG. 5) and are spaced from the inner surface of the sheath 52.

Thus, optimally operating the fuel nozzle 30 entails positioning the aperture 58 in the tubular sheath 52 to face the air flow path 20 so as to intake oncoming compressor discharged air. The sheath 52 with its single air inlet captures the dynamic head that is imposed by the incoming compressor air. The main functionality of the pair of directing members 68 is to direct the air towards the air swirler 48 of the spray tip assembly 40 coupled to the second end portion 62 of the tubular sheath 52. The pair of directing members 68 imposes a flow condition to redistribute the air on the full surface of the air swirler 48 due to pressure recovery inside the annular flow passage 56 between the stem 32 and the tubular sheath 52.

Advantageously, the uniformity of the air entering the air passages 50 of the air swirler 48 assists the fuel atomization and helps promote fuel spray uniformity. Uniformity in the air and fuel leads to better fuel droplet size. The fuel nozzle 30 embodied herein yields small fuel droplets that are preferably below 30 microns in size. Therefore, the winged stem 32 in operation with the tubular sheath 52 advantageously yields excellent air and fuel uniformity and distribution which allows for better mixing and heat release per fuel nozzle 30 and promotes low emissions and low invisible smoke number. Furthermore, the fuel nozzle 30 described herein helps prolong the life of the combustor 16 and hot end components such as the carrier ring and turbine blades of the gas turbine engine 10. The fuel nozzle 30 also helps promote a low noise emitting combustor 16.

The above description is meant to be exemplary only, and one skilled in the art will recognize that changes may be made to the embodiments described without department from the scope of the invention disclosed. For example, the directing member may be provided in many forms and can be mounted otherwise so long as its functionality remains the same: directing a fluid flow entering the aperture towards the air swirler in a uniform distribution. It should also be understood that the tubular sheath may be attached to the fuel adapter and spray tip assembly in many different ways. The tubular sheath may even be joined to the stem directly. Still other modifications which fall within the scope of the present invention will be apparent to those skilled in the art, in light of a review of this disclosure, and such modifications are intended to fall within the appended claims.

The invention claimed is:

1. A gas turbine engine fuel nozzle comprising: a fuel conveying member having a stem defining at least one fuel passage, a spray tip connected in fluid flow communication with said at least one fuel passage, said spray tip having an air swirler, a sheath provided about said stem, an annular air passage defined between said stem and said sheath, said air passage leading to air openings defined through said air swirler, an air inlet defined through a side wall of said sheath for connecting said annular air passage in fluid flow communication with a source of air, and at least one wing-like projection extending longitudinally along the stem into the annular air passage for redirecting air entering the annular air passage towards the air swirler of the spray tip, the at least one wing-like projection extending axially from an inlet end of the stem beyond the air inlet towards said spray tip.

2. The fuel nozzle as defined in claim 1, wherein the at least one wing-like projection comprises a pair of wings on the stem.

3. The fuel nozzle as defined in claim 2, wherein the wings are is disposed on opposite sides of the stem.

4. The fuel nozzle as defined in claim 3, wherein the pair of wings extends axially from the inlet end of the stem to approximately ¾ of the stem length.

5. The fuel nozzle as defined in claim 2, wherein the pair of wings extends outwardly from diametrically opposite sides of the stem.

6. The fuel nozzle as defined in claim 5, wherein said air inlet is the sole air inlet of the annular air passage.

7. The fuel nozzle defined in claim 6. wherein the air inlet is provided in the form of an elongated slot defined in an end portion of the sidewall of the sheath opposite to said spray tip, the slot having longitudinal axis along a circumferential direction about the stem.

8. The fuel nozzle as defined in claim 1, wherein the sheath has a first end adapted for attachment to a fuel adapter connected to the fuel conveying member and a second end adapted for attachment to the spray tip around the air swirler.

9. The fuel nozzle defined in claim 1, wherein said at least one wing-like projection is spaced radially inwardly of an inner surface of the sheath.

10. A fuel nozzle comprising a stem having at least one fuel passage extending therethrough, a spray tip connected in fluid flow communication with the stem, the spray tip having an air swirler, a tubular sheath having a sidewall surrounding the stem defining an air passage therebetween, the air passage being connected in fluid flow communication with said spray tip, the sidewall of the tubular sheath defining an aperture in fluid flow communication with the air passage, and at least one wing-like projection extending axially along said stem into said air passage for directing air entering the air passage from the aperture to the air swirler of the spray tip, said at least one wing-like projection having a length defined between first and second axially opposed ends, and wherein said aperture is axially disposed between said first and second ends.

11. The fuel nozzle as defined in claim 10, wherein said at least one wing-like projection comprises a pair of wing-like projection, the pair of wing-like projections extending axially from an inlet end of the stem to approximately ¾ of the stem length.

12. The fuel nozzle as defined in claim 10, wherein the aperture in the sidewall of the tubular sheath is proximal an inlet end of the stem.

13. The fuel nozzle as defined in claim 12, wherein the aperture has an elongated shape and extends along a portion of a circumference of the tubular sheath.

* * * * *

UNITED STATES PATENT AND TRADEMARK OFFICE
CERTIFICATE OF CORRECTION

PATENT NO. : 7,624,576 B2  Page 1 of 1
APPLICATION NO. : 11/182750
DATED : December 1, 2009
INVENTOR(S) : Hisham Alkabie et al.

It is certified that error appears in the above-identified patent and that said Letters Patent is hereby corrected as shown below:

Title Page, Item (75), Inventors

In second inventor first name, delete "Klan" insert --Kian--

Signed and Sealed this

Nineteenth Day of January, 2010

David J. Kappos
*Director of the United States Patent and Trademark Office*